United States Patent

Hirunuma et al.

[11] Patent Number: 6,043,934
[45] Date of Patent: *Mar. 28, 2000

[54] OBSERVING EQUIPMENT HAVING HAND-VIBRATION COMPENSATION SYSTEM

[75] Inventors: Ken Hirunuma, Tokyo; Shinji Tsukamoto; Tetsuo Sekiguchi, both of Saitama-ken; Moriyasu Kanai, Tokyo, all of Japan

[73] Assignee: Asahi Kogaku Kogyo Kabushiki Kaisha, Tokyo, Japan

[*] Notice: This patent is subject to a terminal disclaimer.

[21] Appl. No.: 09/203,521

[22] Filed: Dec. 1, 1998

[30] Foreign Application Priority Data

Dec. 2, 1997 [JP] Japan ................................. 9-331660

[51] Int. Cl.⁷ .................................................. G02B 27/64
[52] U.S. Cl. ........................... 359/557; 359/554; 396/52; 396/55
[58] Field of Search ..................... 359/554–557, 359/407–420, 431, 480–482, 813–814, 823–824, 831–836; 396/52–55; 348/208

[56] References Cited

U.S. PATENT DOCUMENTS

| | | | |
|---|---|---|---|
| 4,013,339 | 3/1977 | Ando et al. | 359/556 |
| 5,231,534 | 7/1993 | Kato | 359/432 |
| 5,280,387 | 1/1994 | Maruyama | 359/554 |
| 5,387,999 | 2/1995 | Hayashi | 359/557 |
| 5,461,513 | 10/1995 | Maruyama | 359/837 |
| 5,754,339 | 5/1998 | Kanai et al. | 359/557 |
| 5,768,016 | 6/1998 | Kanbara | 359/557 |
| 5,917,653 | 6/1999 | Taniguchi | 359/557 |

FOREIGN PATENT DOCUMENTS

| | | |
|---|---|---|
| 2-81009 | 3/1990 | Japan . |
| 2284113 | 11/1990 | Japan . |
| 3237438 | 10/1991 | Japan . |
| 6-43365 | 2/1994 | Japan . |
| 7248522 | 9/1995 | Japan . |
| 7311368 | 11/1995 | Japan . |

*Primary Examiner*—Thong Nguyen
*Attorney, Agent, or Firm*—Greenblum & Bernstein, P.L.C.

[57] ABSTRACT

A binocular is provided with a pair of telescopic optical systems. Each of the pair of telescopic optical systems has an objective lens, an erecting system, a compensation lens and an observing optical system. The erecting system of each of the telescopic optical systems is divided into two sub prisms, a vertically extending optical axis is defined therebetween. The compensation lens is located between the first and second sub prisms such that it is movable in a horizontal plane by a driving mechanism. As the compensation lens moves, an optical path of light passed therethrough changes. Accordingly, by driving the compensation lens in accordance with the hand-vibration, trembling of the image can be compensated.

18 Claims, 7 Drawing Sheets

OBSERVING EQUIPMENT HAVING HAND-VIBRATION COMPENSATION SYSTEM

BACKGROUND OF THE INVENTION

The present invention relates to an observing equipment such as a binocular, a monocular, or a terrestrial telescope that has a hand-vibration compensation system.

Recently, binoculars provided with hand-vibration compensation systems for compensating trembling of image due to the hand-vibration have been developed. An example of the conventional hand-vibration compensation system for a binocular includes a variable angle prism which is controlled to change the angle so that trembling of image is cancelled. Such a compensation system is, however, relatively difficult to manufacture and to control.

In a field of cameras, a hand-vibration compensation optical system including compensation lens, which is to be moved within an optical path, has been suggested. If such a compensation system is employed in a binocular, a pair compensation lenses are moved in a direction perpendicular to the optical axis of each telescopic optical system. In such a type of the compensation system, two compensation mechanisms should be provided, which are:

(1) a mechanism for moving the compensation lenses in a vertical direction, i.e., an up/down direction when the binocular is held horizontally; and (2) a mechanism for moving compensation lenses, which are also provided within the optical paths of the telescopic optical systems, in a horizontal direction, i.e., in a right/left direction when the binocular is held horizontally.

For the mechanism which moves the lenses in the vertical direction, it is necessary to change a response speed and/or voltage or electrical current for an actuator, depending on whether the lenses are moved in a direction of the gravity or in the opposite direction. In other words, controlling of the mechanism for moving the lenses should be changed when the lenses are moved in the vertical direction, and accordingly controlling is relatively complicated.

Further, such a mechanism is required to have a driving device which has a relatively large torque in order to move the structure with resisting the gravity, and a relatively large battery for supplying sufficient power to such a driving device. Therefore, the compensation mechanism becomes relatively large.

SUMMARY OF THE INVENTION

It is therefore an object of the present invention to provide an observing equipment having hand-vibration compensation system, which is capable of preventing the affection of the gravitation.

For the above object, according to the present invention, there is provided an observing equipment, which includes: an objective lens for forming an image; an erecting system having first to fourth reflection surfaces that erect the image; an observing optical system for observing image erected by the erecting system; a compensation optical element that is arranged, between the first and fourth reflection surfaces of the erecting system, at a position where an optical axis of the equipment is parallel to an up/down direction of the equipment when said observing equipment is held horizontally; and a driving mechanism for moving the compensation optical element in a plane perpendicular to the up/down direction such that trembling of the image due to a hand vibration is compensated.

With this construction, since the compensation optical element is driven in the plane that is perpendicular to the up/down direction, the driving mechanism is little affected by the gravitation in practical use, which allows simple driving control.

The erecting system may include a first prism that turns an optical axis of the objective lens into the up/down direction and a second prism that turns the turned optical axis into a direction parallel to the optical axis of the observing optical system. In this case, the compensation optical element is arranged between the first and second prisms.

In the specific embodiment, the first prism has two reflection surfaces for rotating the image by 90 degrees, and the second prism having two reflection surfaces for further rotating the image by 90 degrees.

The compensation optical element may be a compensation lens, and decentering of the compensation lens shifts an optical path of light passed through the compensation lens.

It should be noted that the compensation optical element is not limited to a lens. For example, a rotatable prism that rotates about an axis parallel to the up/down direction can be used in place of the compensation lens.

When the observing equipment has a single compensation lens, the driving mechanism includes a frame for holding the compensation lens that is movable in first and second directions which are perpendicular to each other, and actuators for moving the frame in the first and second directions respectively.

Alternatively, when the observing equipment has a pair of compensation lenses, the driving mechanism includes a first frame for holding one of the compensation lenses that is movable in a first direction, a second frame for holding the other of the compensation lenses that is movable in a second direction which is perpendicular to the first direction, a first actuator for moving the first frame in the first direction and a second actuator for moving the second frame in the second direction.

In one particular case, the first to fourth reflection surfaces constitute a type II Porro prism erecting system.

According to an another aspect of the present invention, there is provided a binocular, which includes: right and left telescopic optical systems arranged side by side, each of the telescopic optical system having an objective lens, an erecting system, and an observing optical system, the erecting system having four reflection surfaces that erect an image formed by the objective lens; right and left compensation optical elements that are provided for the right and left telescopic optical systems, each of the compensation optical elements being arranged, between the first and fourth reflection surfaces, at a position where an optical axis of the each telescopic optical system is parallel to an up/down direction of the binocular when the binocular is held horizontally; and a driving mechanism for moving the compensation optical element in a plane perpendicular to the up/down direction such that trembling of the image due to a hand vibration is compensated.

The erecting system may includes a first prism that turns an optical axis of the objective lens into the up/down direction and a second prism that turns the turned optical axis into a direction parallel to the optical axis of the observing optical system. In such the case, the compensation optical element is arranged between the first and second prisms.

In one case, the first and second prisms of one of the telescopic optical systems rotate the image by 90 degrees, respectively, and the first and second prisms of the other of the telescopic optical systems rotate the image by 90 degrees, respectively.

In another case, the first and second prisms of one of the telescopic optical systems rotate the image by 90 degrees, respectively, and the first and second prisms of the other of the telescopic optical systems rotate the image by −90 degrees, respectively.

The compensation optical element may be a compensation lens, and decentering of the compensation lens shifts an optical path of light passed through the compensation lens.

When the each of the telescopic optical systems has a single compensation lens, the driving mechanism includes a frame for holding the right and left compensation lenses, a first actuator for shifting the frame so that the compensation lenses are moved along a first direction and a second actuator for shifting the frame so that the compensation lenses are moved along a second direction perpendicular to the first direction.

Alternatively, when the two pairs of right and left compensation lenses are provided, the driving mechanism includes a first frame for holding the first pair of right and left compensation lenses, a second frame for holding the second pair of right and left compensation lenses, a first actuator for moving the first frame so that the first pair of compensation lenses move along a first direction, a second actuator for moving the second frame so that the second pair of compensation lenses move along a second direction perpendicular to the first direction.

In one particular case, the first and second prisms constitute a type II Porro prism.

DESCRIPTION OF THE ACCOMPANYING DRAWINGS

DESCRIPTION OF THE EMBODIMENTS

Hereinafter, embodiments of the invention will be described with reference to the accompanying drawings. In this specification, the observing equipment refers to a binocular, a terrestrial telescope, a monocular or the like, which includes an objective lens, an erecting optical system, and an eyepiece for observing the erected image.

[First Embodiment]

Figure 1:
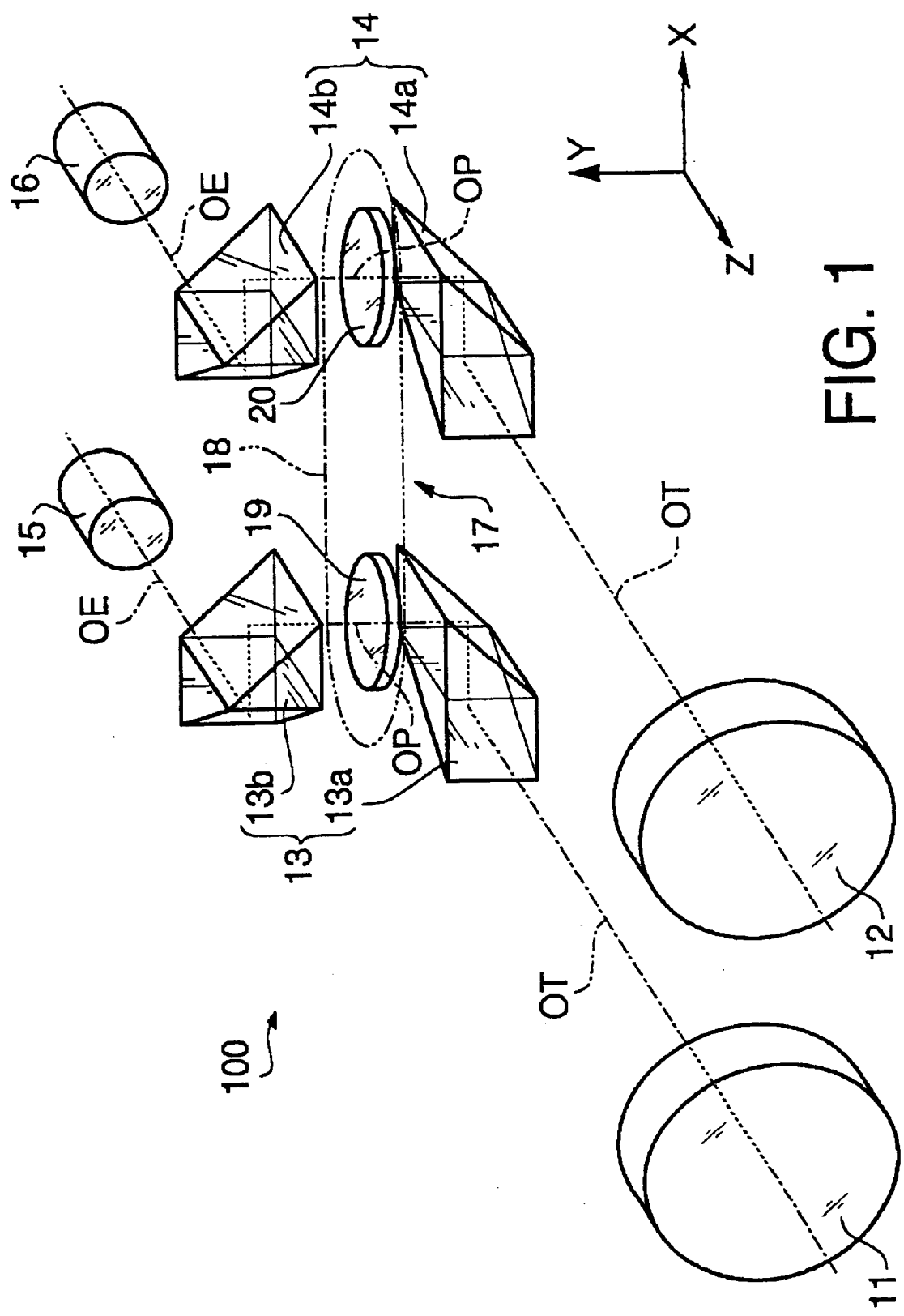
FIG. 1 is a perspective view of an optical system showing arrangement of optical elements of a binocular according to a first embodiment of the invention.

FIG. 1 shows an optical system 100 of a binocular according to a first embodiment of the invention. The binocular is provided with right and left telescopic optical systems arranged side by side for right and left eyes of a user.

The right telescopic optical system for the right eye (on the left-hand side in FIG. 1) includes a right objective lens 11 at a front end, a right erecting system 13 and a right eyepiece 15 as an observing optical system. The left telescopic optical system for the left eye (on the right-hand side in FIG. 1) also includes a left objective lens 12, a left electing system 14 and a left eyepiece 16. It should be noted that, although the objective lenses and eyepieces are described as a single lens in the embodiments, each of the lenses may include a plurality of groups and/or a plurality of lenses.

When the binocular 100 is held by a user to observe an object, in general, the optical axes OT of the objective lenses 11 and 12 are substantially parallel to the horizontal direction. In the following description, an X-Y-Z axis system is indicated to clarify directions. Specifically, an X-axis corresponds to a right/left direction when the binocular 100 is held horizontally; a Y-axis corresponds to a up/down direction when the binocular 100 is held horizontally; a Z-axis corresponds to a direction of optical axes of the telescopic optical systems. Further, the rotation of the image in a clockwise direction is represented by plus (+) sign and that in a counterclockwise direction is represented by minus (−) sign.

Figure 10:
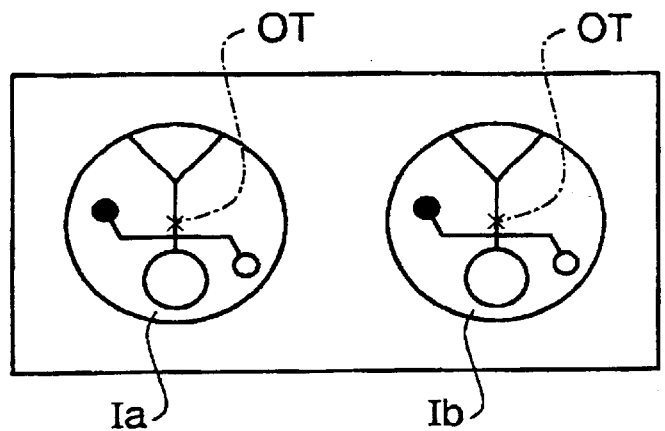
FIG. 10 shows orientation of the images at a position between the objective lens and the erecting system in the first and second embodiments.

The objective lenses 11 and 12 respectively form reversed images Ia and Ib, an example of such images are illustrated in FIG. 10. The reversed images Ia and Ib are erected into proper orientation through the erecting systems 13 and 14.

Figure 11:
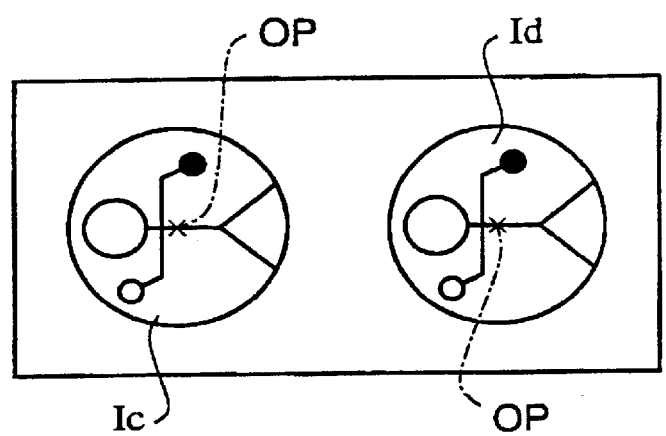
FIG. 11 shows orientation of the images at a position between the first and second sub prisms in the first embodiment.

The erecting system 13 included in the right eye telescopic optical system is provided with first and second sub prisms 13a and 13b that are arranged in the Y-axis direction. The first sub prism 13a has two reflection surfaces for rotating the image by +90 degrees, and for turning the optical axis OT, which extends in the Z-axis direction, of the object lens 11 into the optical axis OP, which extends in the Y-axis direction. The reversed image Ia is rotated by the first sub prism 13a to form a rotated image Ic as shown in FIG. 11. The second sub prism 13b has two reflection surfaces for further rotating the image by 90 degrees and for turning the optical axis OP into the optical axis OE, which-extend in the Z-axis direction and coincides with the optical axis of the eyepiece 15. Specifically, the sub prisms 13a and 13b are formed by dividing a type II Porro prism system into two separate elements. It should be noted that, as far as an optical axis extending in the Y-axis direction is included, the type II Porro prisms system may be dived in another way, for example, into two elements respectively having one and three reflection surfaces.

Similar to the erecting system 13, the left eye erecting system 14 includes a first and second sub prisms 14a and 14b that are also formed by dividing the type II Porro prism system. It should be noted that, in the embodiment, orientations of the sub prisms 13a and 14a are similar, and orientations of the sub prisms 13b and 14b are similar.

With this structure, the first sub prism 14a rotates the reversed image Ib by 90 degrees to form a rotated image Id (see FIG. 11), and turns the optical axis OT of the left object lens 12 into the optical axis OP. The light reflected inside the first sub prism 14a is then incident on the second sub prism 14b in which the orientation of the image is further rotated by 90 degrees and the optical axis OP is turned into the optical axis OE of the left eyepiece 16.

The optical axes OT of the object lenses 11 and 12 are parallel to each other. In this specification, a plane including the optical axes OT, which is parallel with an X-Z plane, will be referred to as a horizontal plane. The optical axes OE of the eyepieces 15 and 16 are parallel to each other and they are parallel to the horizontal plane, or the X-Z plane. Further, the optical axes OP are parallel to each other and they are perpendicular to the horizontal plane.

In the binocular according to the first embodiment, a right compensation lens 19 is provided between the first and second sub prisms 13a and 13b, a left compensation lens 20 is provided between the first and second sub prisms 14a and 14b. The optical axes OP intersect the right and left compensation lenses 19 and 20.

The compensation lenses 19 and 20 are driven to move on a plane parallel to the horizontal plane by a driving mechanism 17 such that trembling of the image due to a hand vibration applied to the binocular 100 is compensated. The right compensation lens 19 and the left compensation lens 20, both are positive lenses, are the same lens. Since decentering of the lens causes prism function that bends the direction of a light beam passed therethrough, the trembling of the image can be compensated by controlling the decentering of the compensation lenses 19 and 20.

At the initial positions of the compensation lenses 19 and 20, the optical axes of the lenses 19 and 20 coincide with the optical axes OP.

Figure 2:
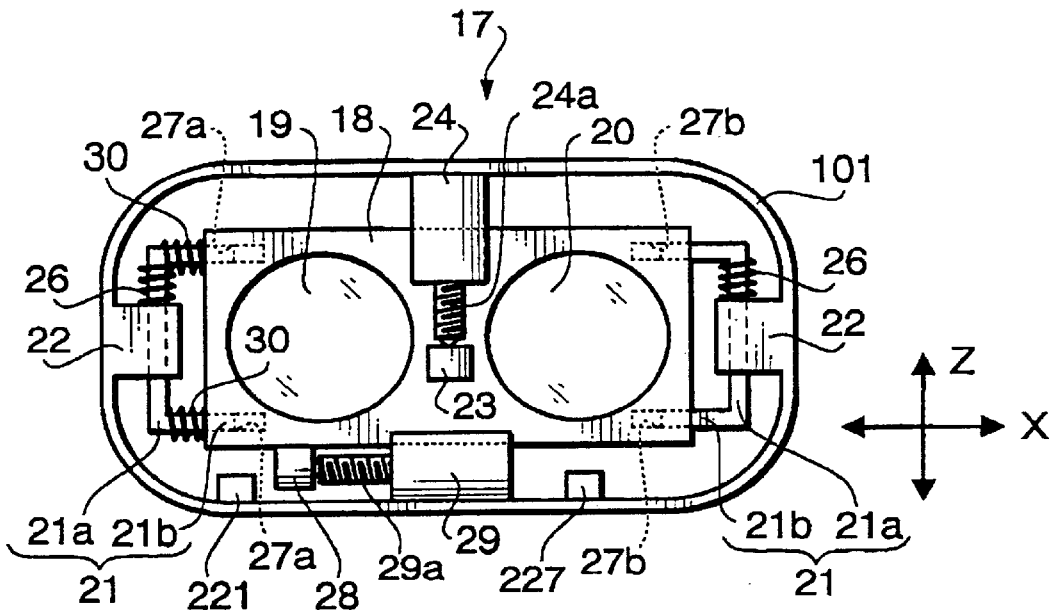
FIG. 2 shows a schematic structure of the driving mechanism shown in FIG. 1 viewed in the horizontal plane.

The driving mechanism 17 of the first embodiment includes, as shown in FIG. 2, a rectangular lens frame IS that holds both of the compensation lenses 19 and 20 at openings formed thereon, a first actuator 24 for shifting the rectangular lens frame 18 in the Z-axis direction and a second actuator 29 for shifting the frame 18 in the X-axis direction.

At longitudinal side ends of the lens frame 18, a pair of guide bars 21 and 21 are provided. The guide bar 21 has a center bar 21a and edge bars 21b formed at both edges of the center bar 21a. The edge bars 21b are perpendicular to the center bar 21a and extend in the same direction, i.e., in the X-axis direction. The guide bars 21 and 21 are arranged such that the center bars 21a and 21a are parallel to the Z-axis and that the tip ends of the edge bars 21b and 21b slidably support the rectangular lens frame 18.

The center bars 21a and 21a of the guide bars 21 and 21 are slidably fitted in through-holes formed in a pair of supports 22 and 22 that are formed inside the body 101 of the binocular.

The tip ends of the edge bars 21b of the one guide bar 21 are slidably inserted in holes 27a and 27a formed at one side end of the rectangular lens frame 18. The tip ends of the edge bars 21b of the other guide bars 21 are slidably inserted into holes 27b and 27b formed at the opposite side end of the rectangular lens frame 18.

With this structure, the lens frame 18 is movable, with respect to the body 101, in the Z-axis direction as well as in the X-axis direction.

The first and second actuator 24 and 29 are attached on the inner surface of the body 101 of the binocular 100. A plunger 24a of the first actuator 24 is capable of protruding/retracting in the Z-axis direction. The plunger 24a abuts a projection 23 formed on the lens frame 18 at a position between the pair of compensation lenses 19 and 20. Further, coil springs 26 and 26 are provided to the center bars 21a and 21a to bias the lens frame 18 in the upward direction in FIG. 2, i.e., in the Z-axis direction, with respect to the body 101 of the binocular.

A plunger 29a of the second actuator 29 is capable of protruding/retracting in the X-axis direction. The plunger 29a abuts a projection 28 formed on the side of the lens frame 18. The coil springs 30 and 30 are provided to the edge bars 21b and 21b of the one guide bar 21 to bias the lens frame 18 in the rightward direction in FIG. 2.

When electrical power is applied to the first actuator 24 to make the plunger 24a protrude, the projection 23 is pushed to linearly move the rectangular lens frame 18 in the downward direction in FIG. 2. When electrical power is applied so that the plunger 24a retracts, then due to force of the coil springs 26, the projection 23 is kept contacting the plunger 24a, i.e., the lens frame 18 moves in the upward direction in FIG. 2.

Similarly, when electrical power is applied to the second actuator 29 to make the plunger 29a protrude, the projection 28 is pushed to linearly move the rectangular lens frame 18 in the leftward direction in FIG. 2. When, the electrical power is applied so that the plunger 29a retracts, the lens frame 10 moved in the rightward direction in FIG. 2 due to force of the coil springs 30 and 30.

Since the reversed images are rotated by 90 degrees through the first sub prisms 13a and 14a, when the compensation lenses 19 and 20 are moved in the X-axis direction, the image moves, in the user view, in the vertical (up/down) direction. Further, when the compensation lenses 19 and 20 are moved in the X-axis direction, the image moves, in the user view, in the horizontal (right/left) direction. Accordingly, by controlling the first actuator 24, trembling of the image due to the horizontal hand-vibration applied to the binocular 100 can be compensated, and by controlling the second actuator 29, trembling of the image due to the vertical hand-vibration can be compensated.

The driving mechanism 17 is provided with an X-direction position sensor 221 and a Z-direction position sensor 227 that are attached to the body 101 of the binocular to detect the position, in the X-axis and Z-axis directions, of the lens frame 18. The position sensor may be an optical sensor having a light emitting element and a position sensitive device (PSD).

Figure 3:
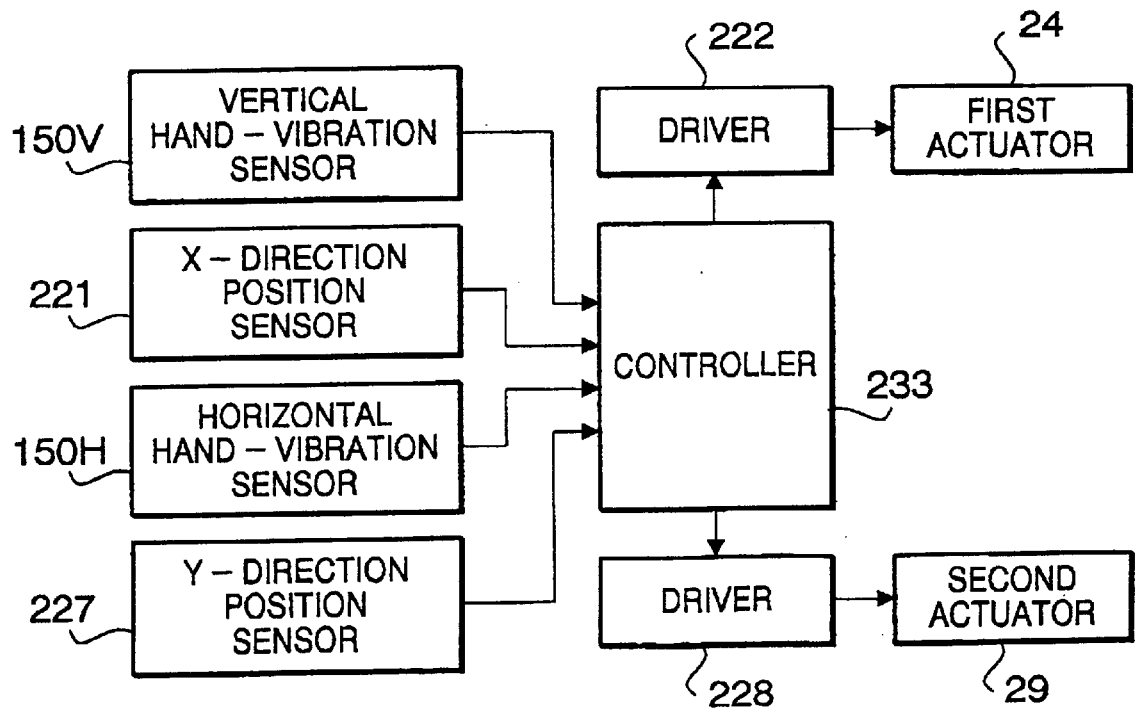
FIG. 3 shows a block diagram illustrating a control system for controlling the driving mechanisms.

As shown in FIG. 3, the first and second actuator 24 and 29 are controlled by a controller 233 through drivers 222 and 228 respectively. The controller 233 controls the drivers 222 and 228 based on the signals from a vertical hand-vibration sensor 150V, a horizontal hand-vibration sensor 150H, the X-direction position sensor 221, and the Z-direction position sensor 227.

The controller 233 calculates amounts of hand vibration applied to the binocular 100 in vertical (i.e., Y-axis) and horizontal (i.e., X-axis) directions, and controls the drivers 222 and 228 to drive the first and second actuators 24 and 29 by an amount corresponding to the amount of movement of the image due to the hand-vibration. Specifically, the controller 233 determines a target position to which the lens frame 18 is to be positioned for canceling change of the position of the image due to the hand-vibration based on the amounts of movement detected by the hand-vibration sensors 150V and 150H. Then, the controller 233 controls the drivers 222 and 228 to move the lens frame 18 to the calculated target position with monitoring the position detected by the position sensors 221 and 227. As the above control is continuously executed, the controller 233 continuously updates the target position, and accordingly, trembling of the images due to the hand-vibration.

According to the first embodiment, since the compensation lenses 19 and 20 are arranged in the optical axes OP between the first and second sub prisms of the erecting systems 13 and 14, the lens frame 18 moves in a plane parallel to the horizontal plane in practical use, i.e., when the binocular is held horizontally. Thus, the movement of the frame 18 is little affected by the gravity. Accordingly, the torque required for the actuator is relatively small, and the shift amount of the compensation lens in any directions linearly corresponds to driving voltage or current for the actuator of the driving mechanism, which simplifies the driving control.

At a position farther from the object lens is, the beam diameter is smaller. Accordingly, the above arrangement of allows a smaller diameter of the compensation lenses 19 and 20 as compared with a case where the compensation lens is arranged closer to the objective lens.

[First Embodiment-Alternative Structure]

Figure 4:
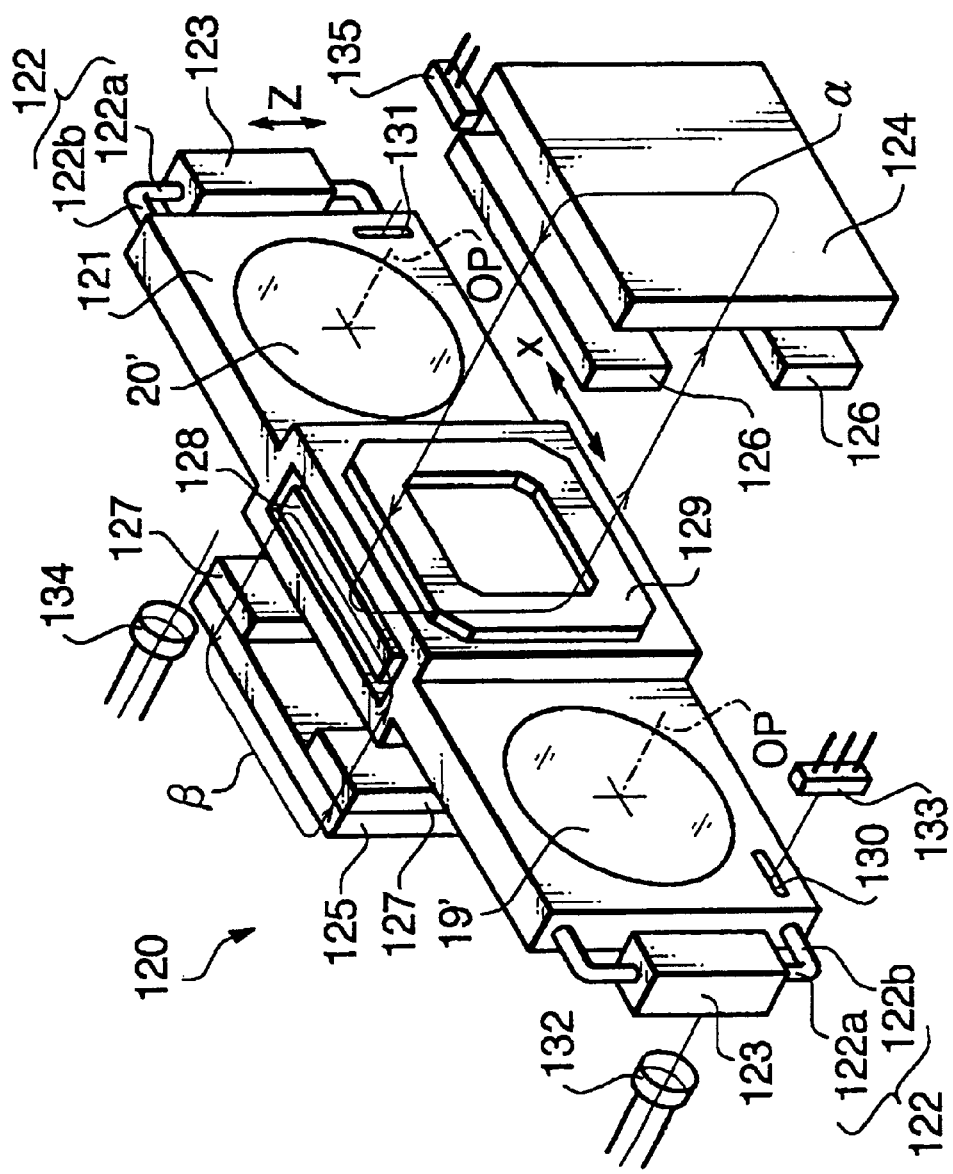
FIG. 4 is a modified structure of a driving mechanism.

FIG. 4 shows a driving mechanism 120 that is an alternative to the mechanism shown in FIG. 2. A lens frame 121 of the driving mechanism 120 holds compensation lenses 19' and 20'. The lens frame 121 is supported by the similar a mechanism as shown in FIG. 2 and is movable in the X-axis and Z-axis directions.

The lens frame 121 is provided with a pair of guide bars 122 at its longitudinal end portions. Center bars 122a and 122a of the guide bars 122 are slidably fitted in through holes formed in supports 123, respectively. Edge bars 122b and 122b of the each guide bar 122 are slidably inserted into holes formed on the sides of the lens frame 121 that are similar to the holes 27a and 27b of the lens frame 18 of the first embodiment.

At one side of the lens frame 121, a yoke plate 124 is provided, and between the yoke plate 124 and the lens frame 121, a pair of permanent magnets 126 are provided. Each of the permanent magnets 126 elongated and extends in the X-axis direction. At the other side of the lens frame 121, another yoke plate 125 is provided with permanent magnets 127 and 127 that are arranged to be parallel to the Z-axis direction. At a central portion of the lens frame 121, another yoke plate 128 is secured. With this structure, a magnetic field represented by line α is generated by the magnets 126 and 126, and a magnetic field represented by line β is generated by the magnets 127 and 127. On one side of the lens frame 121, a driving coil 129 having a frame-like shape is attached in the magnetic field α, and the other side, another driving coil (not shown) is attached in the magnetic field β.

The electrical current flowing in the coil 129 generates a force for moving the lens frame 121 in the Z-axis direction. Accordingly, by controlling the electrical current flowing through the coil 129, the lens frame 121 can be driven to move in the Z-axis direction. The electrical current flowing in the another coil moves the lens frame 121 in the X-axis direction.

As shown in FIG. 4, a slit 130 extending in the X-axis direction is formed on the lens frame 121. A light emitting device 132 and a position sensitive device (PSD) 133 face each other with the slit 130 positioned therebetween. Further, another slit 131 extending in the Z-axis direction is formed, a light emitting device 134 and a PSD 135 face each other with the slit 131 positioned therebetween. Accordingly, output of the PSD 133 represents the position of the lens frame 121 in the Z-axis direction and the output of the PSD 135 represents the position of the lens frame 121 in the X-axis direction.

When the driving mechanism shown in FIG. 4 is provided instead of the mechanism shown in FIG. 2, the electric current for the coils are controlled by a controller in a similar manner with the first embodiment. The controller calculates the target position of the compensation lenses based on the signal from the vertical and horizontal hand-vibration sensors and the PSD 133 and 135. Then controller is controls the electric current applied for the coils through the drivers.

[Second Embodiment]

FIGS. 5 through 9 show a binocular having a hand-vibration compensation system according to a second embodiment of the present invention.

Figure 5:
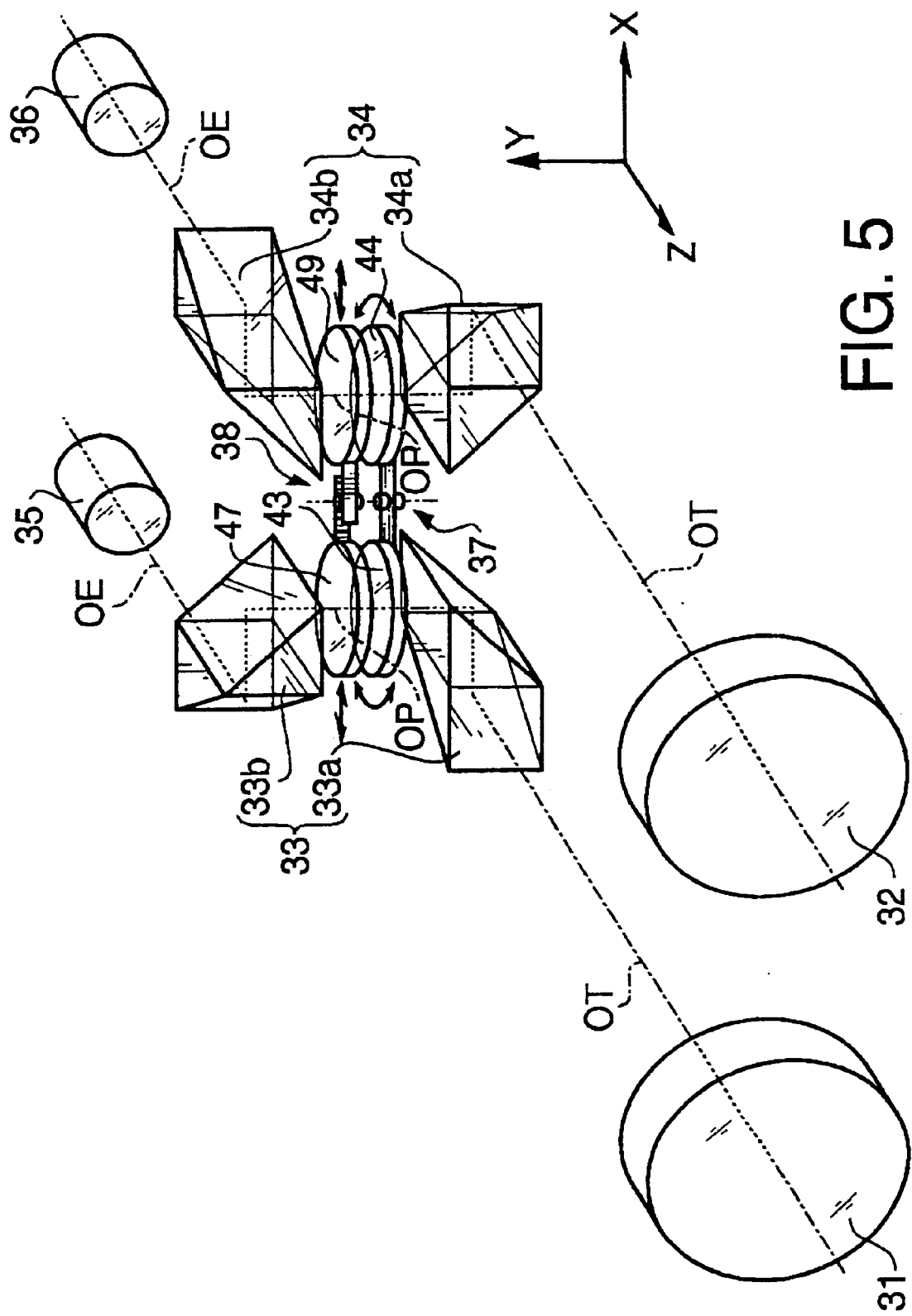
FIG. 5 is a perspective view showing arrangement of optical elements of a binocular according to a second embodiment of the invention.

The optical system of the second embodiment is provided with, as shown in FIG. 5, objective lenses 31 and 32, erecting systems 33 and 34, eyepieces 35 and 36, a first pair of compensation lenses 43 and 44, and a second pair of compensation lenses 47 and 49. The compensation lenses 43 and 44 are plano-concave lenses having identical negative power, the compensation lenses 47 and 49 are plano-convex lenses having identical positive power (See FIG. 6).

In the second embodiment, the objective lenses 31 and 32 respectively form reversed images Ia and Ib, an example of such images are illustrated in FIG. 10. The reversed images Ia and Ib are erected into proper orientation through the erecting systems 33 and 34.

Figure 12:
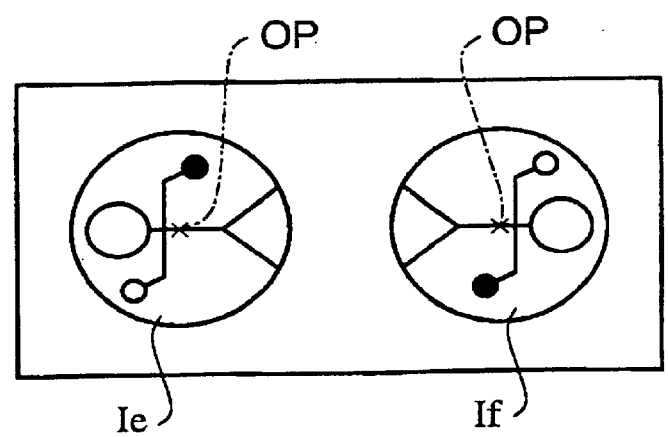
FIG. 12 shows orientation of the images at a position between the first and second sub prisms in the second embodiment.

The erecting system 33 included in the right eye telescopic optical system is provided with first and second sub prisms 33a and 33b that are arranged in the vertical direction. The first sub prism 33a has two reflection surfaces for rotating the image by 90 degrees and turning a optical axis OT of the object lens 31 into the optical axis OP extending in the Y-axis direction. The reversed image Ia is rotated by the first sub prism 33a to form a rotated image Ie as shown in FIG. 12. The second sub prism 13b has two reflection surfaces for further rotating the image by 90 degrees and turning the optical axis OP into the optical axis OE extending in the Z-axis direction, which coincides with the optical axis of the eyepiece 35. Specifically, the sub prisms 33a and 33b are formed by dividing a type II Porro prism system in to two separate elements. It should be noted that, as far as an optical axis extending in the Y-axis is included, the type II Porro prism may be divided in accordance with another way, for example, into two elements having one and three reflection surfaces.

The left eye erecting system 34 includes a first and second sub prisms 34a and 34b that are formed by dividing the type II Porro prism. It should be noted that orientation of the sub prism 34a is symmetric to that of the sub prism 33a, and orientation of the sub prism 34b is symmetric to that of the sub prism 33b.

With this structure, the first sub prism 34a rotates the reversed image Ib by −90 degrees to form a rotated image If (see FIG. 12) and turns the optical axis OT of the left object lens 32 into the optical axis OP. The light reflected inside the first sub prism 34a is then incident on the second sub prism 34b in which the orientation of the image is further rotated by −90 degrees and the optical axis OP is turned into the optical axis OE of the left eyepiece 36.

The compensation lenses 43 and 47 are arranged between the first and second sub prisms 33a and 33b, and the compensation lenses 44 and 49 are arranged between the first and second sub prisms 34a and 34b. The first pair of the compensation lenses 43 and 44 are supported by a first driving mechanism 37 that is rotatable about a rotating axis which is parallel to the optical axis OP. The second pair of compensation lenses 47 and 49 are supported by a second driving mechanism 38 that linearly moves the supported lenses 47 and 49 in the opposite directions to each other. The first driving mechanism 37 is controlled to compensate the movement of the image in the X-axis direction, and the second driving mechanism 38 is controlled to compensate the movement of the image in the Y-axis direction.

Since the erecting system 33 rotates the image in the clockwise direction while the erecting system 34 rotates the image in the counterclockwise direction, the orientation of the images Ie and If are different by 180 degrees at a position between the first and second sub prisms 33a and 34a, and 33b and 34b. Therefore, the compensation lenses of each pair move in the opposite directions to each other.

Figure 6:
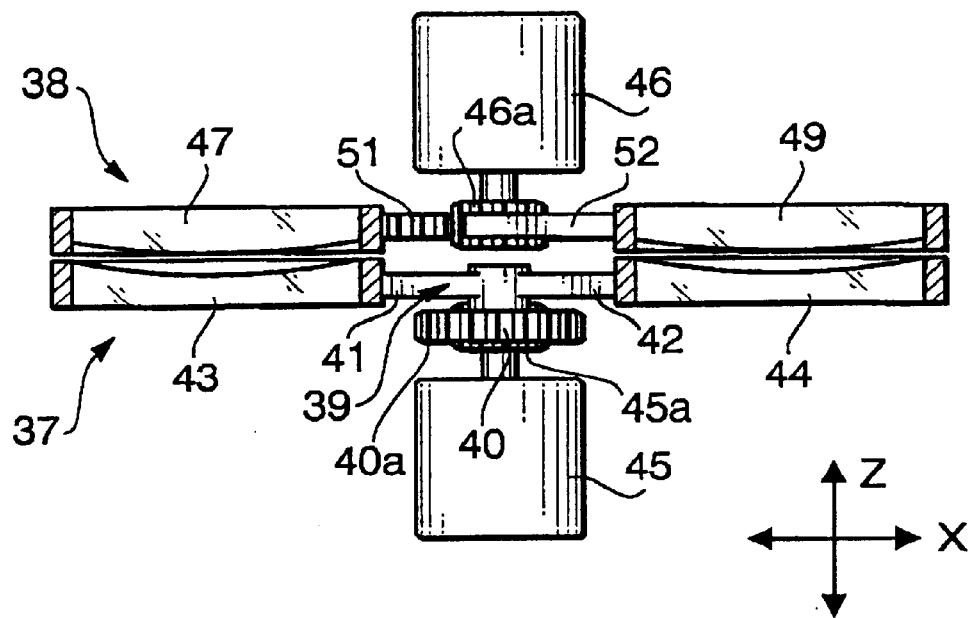
FIG. 6 shows a schematic structure of the driving mechanisms shown in FIG. 5 viewed in the vertical plane.
Figure 7:
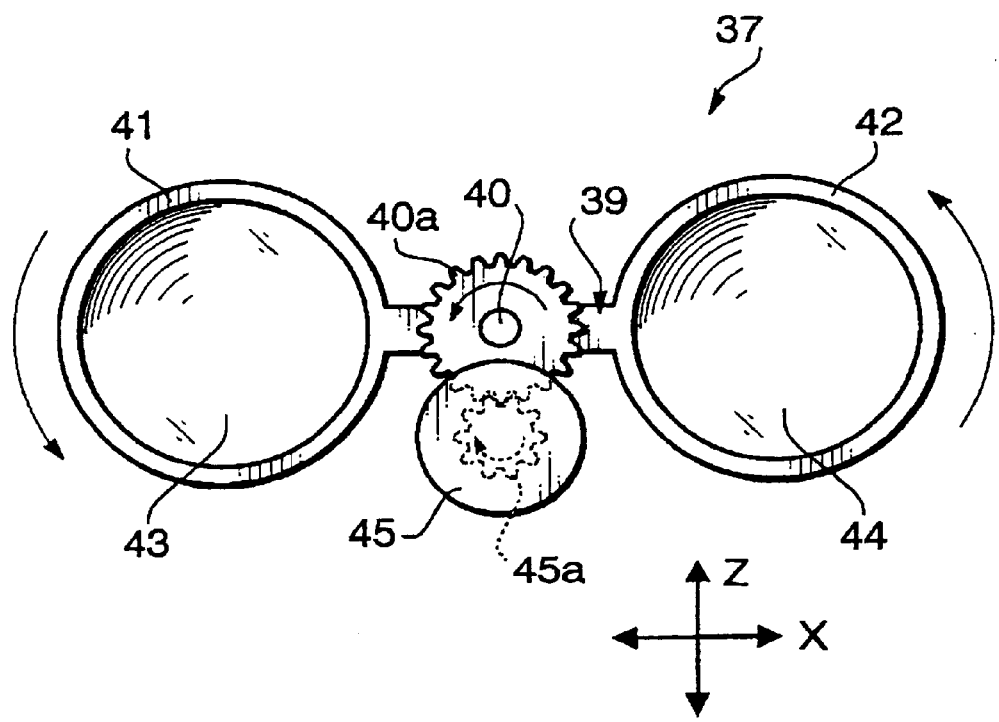
FIG. 7 shows a schematic structure of the first driving mechanism for the horizontal vibration shown in FIG. 6 viewed in the horizontal plane.

As shown in FIGS. 6 and 7, the first driving mechanism 37 includes a rotatable frame (a first frame) 39 that holds the right and left compensation lenses 43 and 44. The rotation axis 40 of the rotatable frame 39 is located at the center of the both of the optical axes OP of the right and left telescopic optical systems, and extends in parallel to the optical axes OP. A right arm 41 and a left arm 42 extend in opposite directions. The right and left arms are arranged such that the optical axes OP intersect the right and left compensation lenses 43 and 44.

A driving gear 40a is secured to the rotation axis 40, with which a pinion gear 45a of a first motor (a first actuator) 45 is engaged. The motor 45 is driven to rotate in either direction such that the pinion gear 45a is rotated in a forward or reverse direction. As shown in FIG. 7, when the pinion gear 45a is rotated in the clockwise direction in FIG. 7, the rotatable frame 39 is driven to rotate in the counterclockwise direction about the rotation axis 40 via the driving gear 40a. When the pinion gear 45a is rotated in the counterclockwise direction in the drawing, the rotatable frame 39 is rotated in the clockwise direction.

As described above, when the rotatable frame 39 is rotated with the motor 45, the compensation lenses 43 and 44 are moved along an arc whose center is the rotation axis 40. However, the amount of displacement in the X-axis direction is small and can be ignored. Thus, the compensation lenses 43 and 44 are moved mainly in the Z-axis direction. Since the Z-axis direction, at the position where the lenses 43 and 44 are located, corresponds to the horizontal direction of the image in the user view, the first driving mechanism 37 mainly compensates the vibration of the image due to hand-vibration applied to the binocular in the horizontal direction when the binocular is held horizontally.

Figure 8:
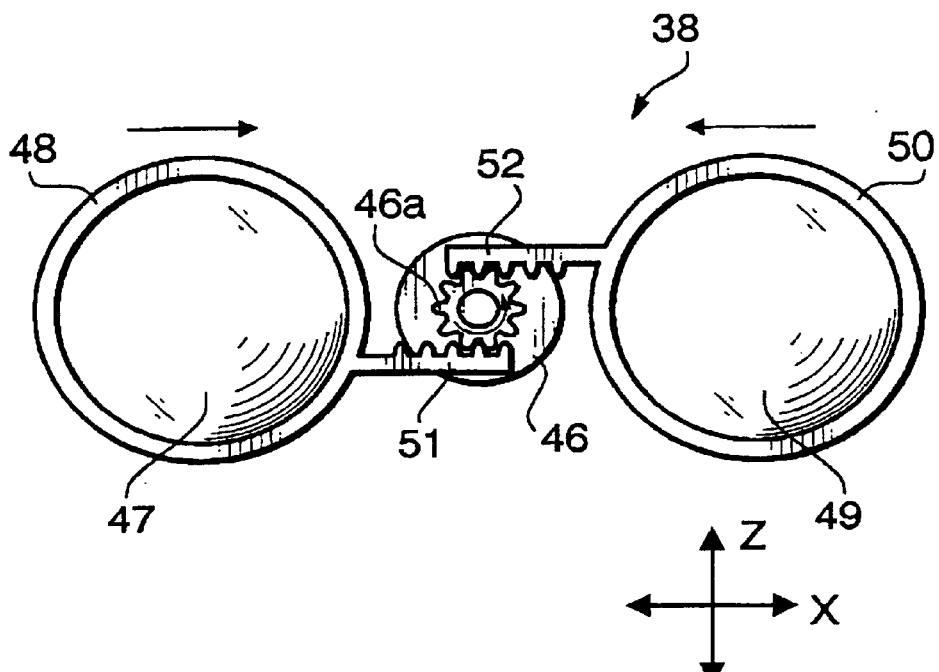
FIG. 8 shows a schematic structure of the second driving mechanism for the vertical vibration shown in FIG. 6 viewed in the horizontal plane.

As shown in FIGS. 6 and 8, the second driving mechanism 38 includes a second frame having right and left movable arms 48 and 50 that hold the right and left compensation lenses 47 and 49. The second driving mechanism 38 has a second motor (a second actuator) 46, to the shaft thereof, a pinion gear 46a is fixed. The right arm 48 has a right rack 51 that engages the pinion gear 46a. Similarly, the left arm 50 has a left rack 52 that engages the pinion gear 46a.

The rack 51 and the rack 52 extend in the X-axis direction, and are engaged with the pinion gear 46a at opposite sides. When the pinion gear 46a rotates, the arm 48 and the arm 50 moves along the x-axis in opposite directions. For example, in FIG. 8, when the pinion gear 46a rotates in counterclockwise direction, the arm 48 and the arm 50 move towards each other, as indicated by arrows.

As described above, the movements of the arms 48 and 50 with the motor 46 move the compensation lenses 47 and 49 along the x-axis direction. Since the x-axis direction, at the position where the lenses 47 and 49 are located, corresponds to the vertical direction of the image in the user view, the second driving mechanism 38 compensates the vibration of the image due to hand-vibration applied to the binocular in the vertical direction when the binocular is held horizontally.

Figure 9:
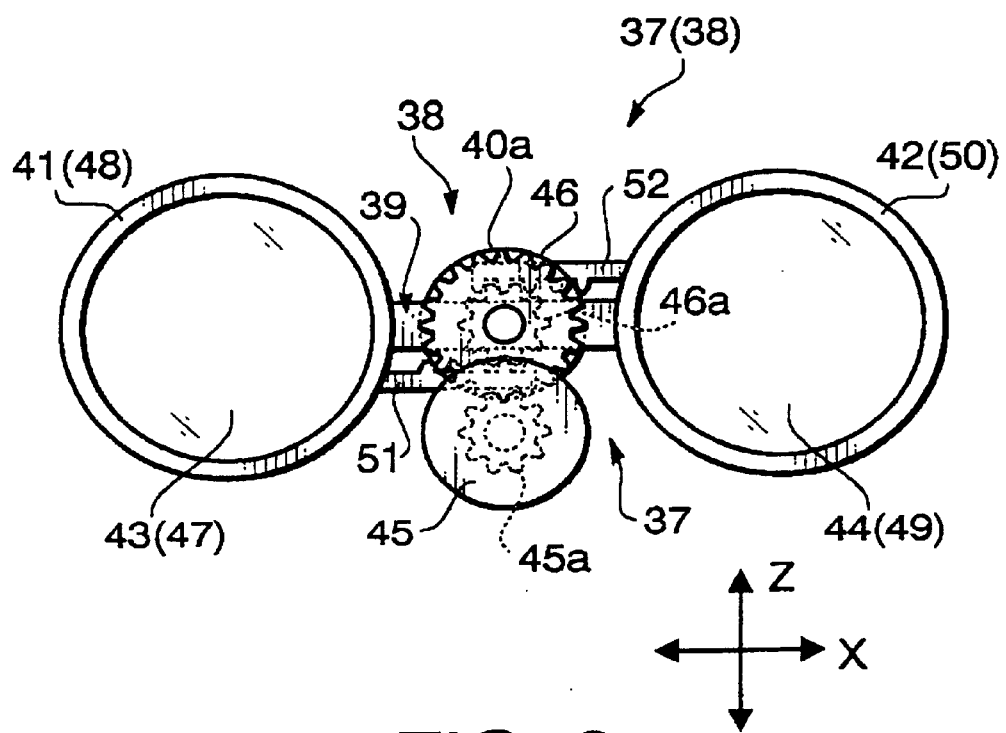
FIG. 9 shows a schematic structure of the driving mechanisms shown in FIG. 6 viewed in the horizontal plane.

FIG. 9 shows a plan view of the driving mechanisms 37 and 38. At the initial positions of the compensation lenses, the optical axes of the lenses are coincide with the optical axes OP.

In the second embodiment, a control system similar to that shown in FIG. 3 or any other suitable control systems including the hand-vibration sensor and the position sensor for detecting the position of the frames can be used. Since the control system has been described above with reference to FIG. 3, description and drawing of the control system applicable to the second embodiment will be omitted.

According to the second embodiment, all of the compensation lenses move in a plane parallel to the horizontal plane in practical use, which is little affected by the gravity. Accordingly, the torque required for the motor is relatively small, and the shift amount of the compensation lens in any directions linearly corresponds to driving voltage or current for the motor of the driving mechanism, which simplifies the driving control.

It should be noted that, in the embodiments, the erected images are observed through the eyepiece lenses. The invention is not limited to this particular structure, and is applicable to a observing equipment in which imaging devices (e.g., a CCD: a Charge Coupled Device) and an imaging lenses are used in place of, or in association with the eyepiece lenses.

Further, in the above embodiments, the hand-vibration compensation system is designed for compensating both of the vertical and horizontal hand-vibrations. However, the system may be designed for compensating the hand-vibration in one of these two directions according to users' purpose.

The present invention is directed to part of an observing equipment that includes hand-vibration sensors, sensors for detecting the position of the compensation lenses. However, the details of the hand-vibration sensors and/or position detection sensors do not form part of the invention. These are provided to assist in understanding of the invention, and any types of suitable hand-vibration sensors and/or position detecting sensors could be employed to control the driving mechanism for the compensation lenses.

What is claimed is:

1. An observing equipment, comprising:
   an objective lens for forming an image;
   an erecting system having first to fourth reflection surfaces that erect said image formed by said objective lens;
   an observing optical system for observing image erected by said erecting system;
   a compensation optical element that is arranged, between first and fourth reflection surfaces of said erecting system, at a position where an optical axis of said equipment is parallel to an up/down direction of said equipment when said observing equipment is held horizontally; and
   a driving mechanism for moving said compensation optical element in a plane perpendicular to said up/down direction such that trembling of said image due to a hand vibration is compensated.

2. The observing equipment according to claim 1, wherein said erecting system includes first and second prisms, said first prism turning an optical axis of said objective lens into said up/down direction, and said second prism turning the turned optical axis into a direction parallel to an optical axis of said observing optical system, and wherein said compensation optical element is arranged between said first and second prisms.

3. The observing equipment according to claim 2, wherein said first prism has two reflection surfaces for rotating said image by 90 degrees, and said second prism having two reflection surfaces for further rotating said image by 90 degrees.

4. The observing equipment according to claim 1, wherein said compensation optical element comprises at least one compensation lens, decentering of said at least one compensation lens shifting an optical path of light passed through said compensation lens.

5. The observing equipment according to claim 4, wherein said driving mechanism includes a frame for holding said compensation lens that is movable in first and second directions perpendicular to each other, and actuators for moving said frame in said first and second directions respectively.

6. The observing equipment according to claim 4, wherein said compensation optical element comprises two compensation lenses arranged between said first and fourth reflection surfaces of said erecting system, and wherein said driving mechanism includes a first frame for holding one of said two compensation lenses that is movable in a first direction, a second frame for holding another of said two compensation lenses that is movable in a second direction perpendicular to said first direction, a first actuator for moving said first frame in said first direction and a second actuator for moving said second frame in said second direction.

7. The observing equipment according to claim 1, wherein said first to fourth reflection surfaces constitute a type II Porro prism erecting system.

8. A binocular comprising:

right and left telescopic optical systems arranged side by side, each of said telescopic optical systems having an objective lens, an erecting system, and an observing optical system, said erecting system having four reflection surfaces that erect an image formed by said objective lens;

a compensation optical element provided for said right and left telescopic optical systems, said compensation optical element being arranged, between said first and fourth reflection surfaces, at a position where an optical axis of said each telescopic optical system is parallel to an up/down direction of said binocular when said binocular is held horizontally; and a driving mechanism for moving said compensation optical elements in a plane perpendicular to said up/down direction such that trembling of said image due to a hand vibration applied to said binocular is compensated.

9. The binocular according to claim 8, wherein each of said erecting systems includes first and second prisms, said first prism turning an optical axis of said objective lens into said up/down direction, and said second prism turning the turned optical axis into a direction parallel to an optical axis of said observing optical system, and wherein each of said compensation optical elements is arranged between said first and second prisms.

10. The binocular according to claim 9, wherein said first and second prisms of one of said telescopic optical systems rotate the image by 90 degrees, respectively, and wherein said first and second prisms of the other of said telescopic optical systems rotate the image by 90 degrees, respectively.

11. The binocular according to claim 9, wherein said first and second prisms of one of said telescopic optical systems rotate the image by 90 degrees, respectively, and wherein said first and second prisms of the other of said telescopic optical systems rotate the image by −90 degrees, respectively.

12. The binocular according to claim 9, wherein said first and second prisms constitute a type II Porro prism erecting system.

13. The binocular according to claim 8, wherein said compensation optical element comprises at least one pair of left and right compensation lenses, decentering of said at least one pair of left and right compensation lenses shifting an optical path of light passed through said at least one pair of left and right compensation lenses.

14. The binocular according to claim 13, wherein said driving mechanism includes a frame for holding both of said compensation lenses, a first actuator for shifting said frame so that said compensation lenses are moved along a first direction and a second actuator for shifting said frame so that said compensation lenses are moved along a second direction perpendicular to said first direction.

15. The binocular according to claim 14, wherein said frame is capable of linearly shifting said compensation lenses in the same direction along said first and second direction.

16. The binocular according to claim 13, wherein said compensation optical element comprises two pairs of right and left compensation lenses, wherein said driving mechanism includes a first frame for holding the first pair of the right and left compensation lenses, a second frame for holding the second pair of the right and left compensation lenses, a first actuator for moving said first frame so that said first pair of compensation lenses move along a first direction, a second actuator for moving said second frame so that said second pair of compensation lenses move along a second direction perpendicular to said first direction.

17. The binocular according to claim 16, wherein said first frame is a rotatable frame having first and second arms that is rotatable about an axis defined at a center of the optical axes of said telescopic optical systems, the first pair of right and left compensation lenses are held at said first and second arms of said rotatable frame and said first actuator rotates said rotatable frame, and wherein said second frame has right and left movable arms that are capable of linearly moving along a line that is perpendicular to said optical axes, the second pair of right and left compensation lenses are held at said movable arms and said second actuator drives said movable arms in opposite directions to each other.

18. The binocular according to claim 8, further comprising an actuator having a magnet field generating system which generates a magnet field around said frame, and a coil fixed to said frame.

* * * * *